United States Patent [19]

Borrelli

[11] Patent Number: 4,836,337

[45] Date of Patent: Jun. 6, 1989

[54] VEHICLE CHOCKING DEVICE FOR FLATBED CARRIER

[76] Inventor: Robert E. Borrelli, 11 Timothy Dr., North Haven, Conn. 06473

[21] Appl. No.: 40,180

[22] Filed: Apr. 17, 1987

[51] Int. Cl.$^4$ .......................... B60P 7/08; B60T 3/00
[52] U.S. Cl. ...................................... 188/32; 188/36; 410/30
[58] Field of Search .................. 188/32, 36, 382, 4 R; 410/3, 30, 8, 19, 9; 105/380, 385, 411

[56] References Cited

U.S. PATENT DOCUMENTS 1,780,277 11/1930 Seeley et al. ...................... 410/30 X
3,912,139 10/1975 Bowman ................................. 410/3
4,024,820 5/1977 Hlinsky et al. .................... 410/30 X

FOREIGN PATENT DOCUMENTS 2452401 11/1980 France ..................................... 410/8

Primary Examiner—Duan A. Reger
Assistant Examiner—Matthew C. Graham
Attorney, Agent, or Firm—McCormick, Paulding & Huber

[57] ABSTRACT

A chocking device for restraining a heavy or oversized vehicle against lateral movement relative to the deck of a low bed trailer or the like. The trailer deck is carried, at least in part, by a pair of support members which extend longitudinally of the trailer and define parallel inwardly facing abutments in general vertical registry with an opening in the deck thereabove. The chocking device comprises a chocking frame for positioning on the deck in lateral bridging relation to the opening. Depending restraining members mounted in fixed position on the lower side of the chocking frame extend through the deck opening and are disposed in engagement or near engagement with the abutments on the support members. The laterally opposite end of the frame define chocking surfaces which cooperate with laterally inwardly facing surfaces on laterally opposed wheels or tracks of an associated vehicle supported on the trailer deck.

17 Claims, 3 Drawing Sheets

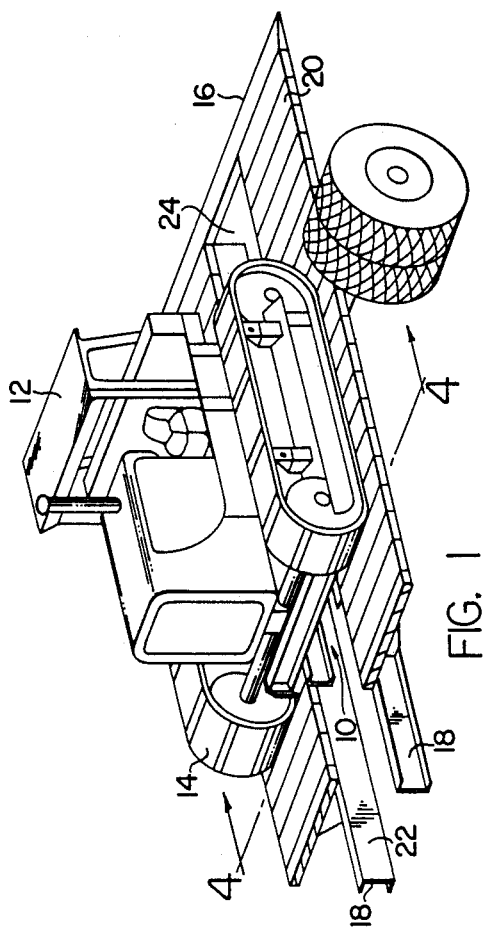
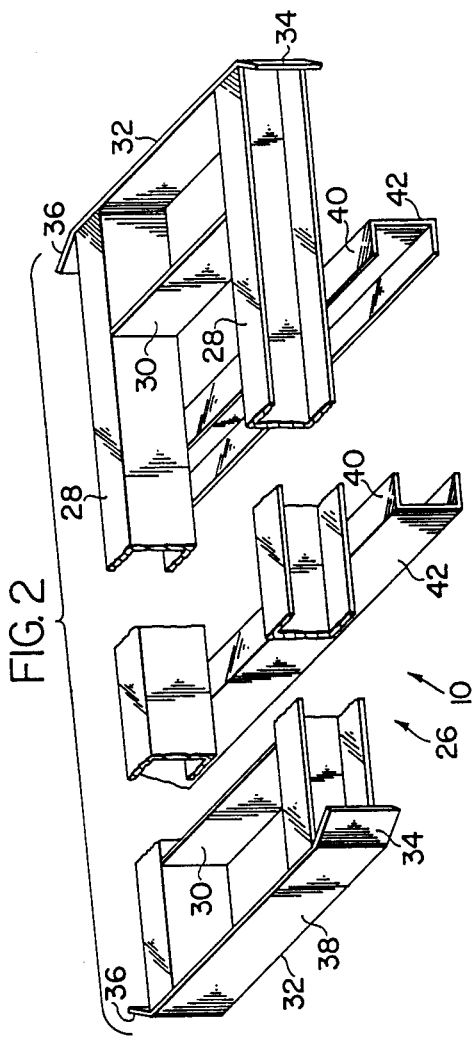
FIG. 1
FIG. 2

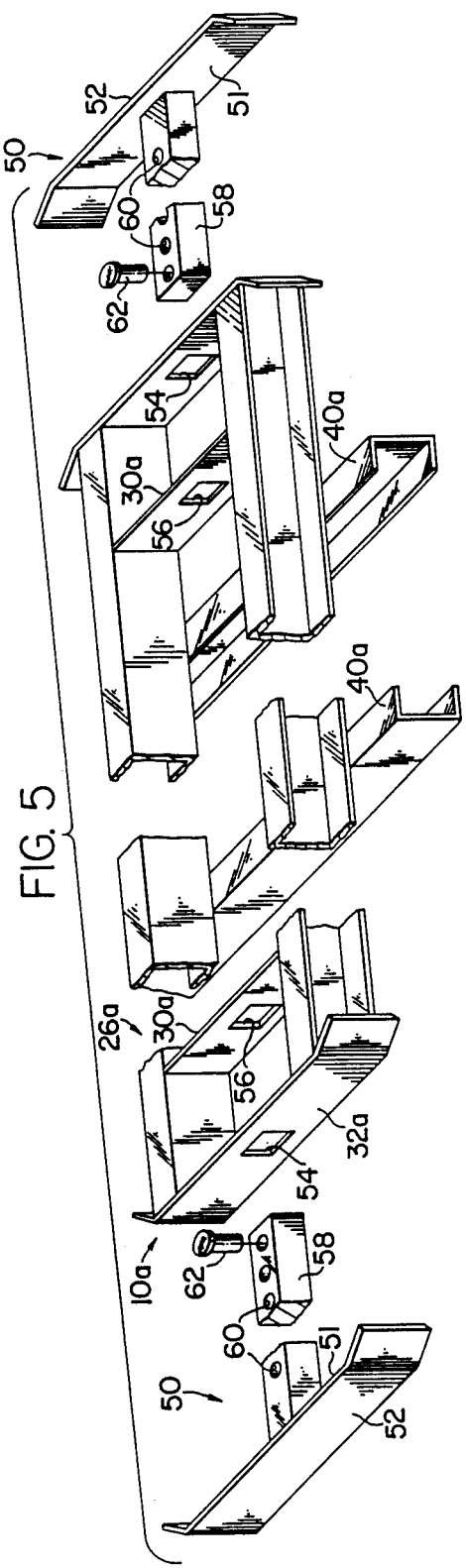

VEHICLE CHOCKING DEVICE FOR FLATBED CARRIER

BACKGROUND OF THE INVENTION

This invention relates in general to chocking devices and deals more particularly with an improved device for restraining a vehicle against lateral movement relative to the deck of a vehicle carrier such as a low bed semi-trailer used to haul heavy or oversize construction equipment including tractors, bulldozers, payloaders, backhoes and the like. The deck of such a trailer is usually supported, at least in part, by laterally spaced apart main support beams which extend longitudinally of the trailer below the deck. In many instances the deck also has a longitudinally extending opening therethrough generally aligned in longitudinal and vertical registry with the support beams therebelow. When such a trailer is used to haul a heavy construction vehicle, the vehicle is driven onto the deck in straddling relation to the deck opening and is secured fore and aft by chains or cables which are generally effective to prevent forward or rearward movement of the vehicle relative to the deck, but which do not provide adequate restraint against lateral movement. Such lateral restraints as may be provided are often make-shift and do not provide adequate resistance to forces encountered when the trailer executes turns. A potentially severe problem often exists during bad weather when the deck may be wet or icy.

It is the general aim of the present invention to provide an improved device for chocking a vehicle against lateral movement on a vehicle carrier. Further aim of the invention is to provide a chocking device which may be rapidly adjusted for chocking vehicles of differing size.

SUMMARY OF THE INVENTION

In accordance with the present invention an improved chocking device is provided for restraining a vehicle against lateral movement relative to the deck of an associated vehicle carrier which includes means defining a pair of laterally inwardly facing abutment surfaces disposed in fixed position relative to the deck. The chocking device comprises a chocking member for positioning on the deck and which has laterally spaced apart and laterally outwardly facing chocking surfaces for engagement with the opposing inner surfaces on the wheels or track of an associated vehicle resting on the deck. The chocking device also includes retaining means defining parallel laterally outwardly facing bearing surfaces for engaging the abutment surfaces to prevent lateral movement of the chocking device relative to the deck whereby the chocking device prevents lateral movement of the vehicle wheels or tracks relative to the deck.

BRIEF DESCRIPTION OF THE DRAWINGS

FIG. 1 is a fragmentary perspective view of a tractor mounted on the deck of a lowbed semi-trailer and chocked against lateral movement by a chocking device embodying the present invention.

FIG. 2 is a somewhat enlarged fragmentary perspective view of the chocking device shown in FIG. 1.

FIG. 5 is a fragmentary perspective view and shows another chocking device embodying the present invention.

DETAILED DESCRIPTION OF PREFERRED EMBODIMENTS

Figure 3:
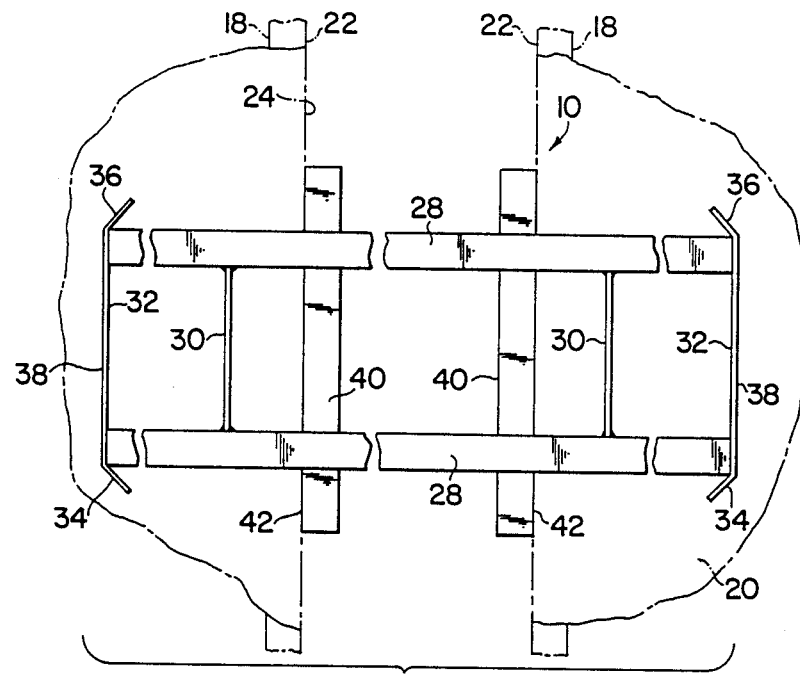
FIG. 3 is a fragmentary plan view of the chocking device of FIG. 1.

Turning now to the drawings, a vehicle chocking device embodying the present invention is indicated generally by the reference numeral 10. The illustrated chocking device 10 is particularly adapted to restrain a vehicle against lateral movement relative to the deck of a flatbed carrier such as a low bed semi-trailer of the type commonly used to transport a heavy or oversized construction vehicle to a job site. In FIG. 1 the chocking device 10 is shown in chocking position relative to a tractor 12 having tracks 14,14 and supported on the deck of a low bed semi-trailer 16.

The illustrated trailer 16 includes a pair of laterally spaced apart, parallel main support members or beams 18,18 which extend longitudinally of the trailer 16 and provide support for its planked horizontal deck 20. The inner sides of the support beams define opposing laterally inwardly facing abutments 22,22. A central opening through the deck 20 and indicated by the numeral 24 is in general vertical registry with the main support beams therebelow. The illustrated vehicle carrier 16 has an opening 24 which extends for the entire length of the deck.

The chocking device 10 is positioned to rest on the surface of deck 20 in bridging relation to the opening 24 and has retaining members which extend through the opening and are disposed in engagement or near engagement with the abutments 22,22. Chocking surfaces at laterally opposite ends of the device 10 cooperate with laterally inwardly facing opposing surfaces on the tracks 14,14 to restrain the vehicle 12 against lateral movement relative to the deck surface, all of which will be hereinafter more fully discussed.

Considering now the chocking device in further detail, the illustrated device indicated generaly at 10, as shown oriented FIGS. 1 and 3 essentially comprises a chocking frame 26 including a pair of elongated extending structural members or channels 28,28 connected together at laterally spaced intervals by longitudinally extending structural members or connecting plates 30,30 welded or otherwise secured to the channels 28,28. The channel members 28,28 are connected together at each end by generally longitudinally extending end plates indicated generally at 32,32 welded or otherwise suitably secured to the ends of the channel members. Each end plate 32 extends beyond the channel members 28,28, substantially as shown in FIG. 2 and has front and rear end portions 34 and 36 bent inwardly toward the central longitudinal axis of the frame 26. The end plates define generally vertical disposed and laterally outwardly facing chocking surfaces indicated at 38,38.

A pair of parallel laterally spaced apart and longitudinally extending structural members or retaining members 40,40 are mounted in fixed position on and relative to the channel members to depend therefrom. The retaining members 40,40 are preferably also channel members arranged with the webs thereof facing laterally outwardly or away from the center of the frame 26. The webs define laterally outwardly facing bearing surfaces 42,42 spaced apart a distance substantially equal to the lateral distance between the abutments 22,22.

As previously noted, the chocking device 10 is positioned on the deck 20 to bridge the opening 24 therein. The depending retaining members 40,40 extend downwardly through the opening and are disposed with the bearing surfaces 42,42 in adjacent or near adjacent engagement with associated portions of the abutments 22,22, which restrains the chocking frame 26 against lateral movement relative to the deck 20. When the deck has a small rectangular opening therethrough the longitudinal dimension of the restraining members is preferably substantially equal to the longitudinal dimension of the deck opening. Consequently, the chocking frame 10 is restrained against longitudinal movement relative to the deck by engagement of the end portions of the restraining members with the deck planks which define the forward and rear edges of the deck opening. However, if the longitudinal extent of the deck opening is substantially greater than the longitudinal dimension of the restraining members, as shown, additional means may be provided for restraining the chocking frame 26 against longitudinal movement relative to the deck 20, as for example, locking pins (not shown) for releasably securing one or both of the retaining members to an associated deck support member.

When a vehicle is driven onto the deck surface after the chocking frame 26 is positioned on the deck the inwardly inclined end portions of the end plates aid to guide the vehicle wheels or tracks into proper positions generally adjacent the chocking surfaces. The illustrated chocking frame is particularly adapted for use with a vehicle carrier used to transport a single type vehicle or several types of vehicles wherein the spacing between the inner surfaces of the vehicle wheels or tracks of the various vehicles to be transported is substantially equal. Some degree of adjustability may be attained by providing wooden blocks or shims for positioning between the chocking surfaces and the inner surfaces of the wheels or tracks of associated vehicles to be chocked. Thus, the chocking device 10 cooperates directly with the inner surfaces of the wheels or tracks or indirectly through shims or blocks to restrain a vehicle against lateral movement relative to the deck.

When the chocking device of the present invention is used with a vhicle carrier to transport vehicles which may vary widely in size an adjustable form of the chocking device may be provided. Such a device is shown in FIG. 5 and indicated generally by the reference numeral 10a. The illustrated device 10a is similar in many respects to the device 10, previously described, and parts of the device 10a which are essentially identical to parts previously described are identified by the same reference numerals and a letter "a" suffix and will not be hereinafter described in detail.

The device 10a is substantially indentical to the device 10, previously described in that it includes a chocking frame 26a and restraining members 40a, 40a. However, the device 10a further includes a pair of adjustable outriggers, indicated generally at 50, 50 which carry adjustable end plates 51, 51 defining laterally outwardly facing chocking surfaces 52, 52.

Figure 4:
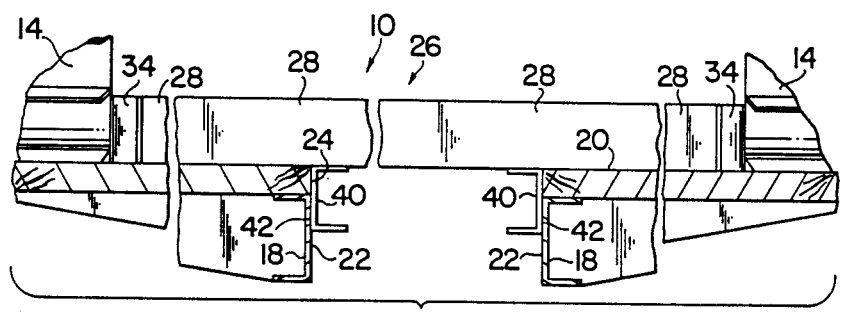
FIG. 4 is a fragmentary sectional view taken along the line 4—4 of FIG. 1.

Each end plate 32a, 32a has a non-circular aperture 54 therethrough as shown in FIG. 4. A similar aperture 56 is formed in an associated connecting plate 30a in lateral alignment with the aperture 54.

The adjustable outriggers are T-shaped and slideably supported for lateral movement generally toward and away from the chocking frame 26a. Each outrigger comprises an adjustable end plate 51 welded to the outer end of an associated structural member 58 of non-circular cross-section adapted to be received in and substantially compliment a pair of associated apertures 54 and 56. Each member 58 has a laterally spaced series of pin receiving holes 60, 60 therethrough. Locking pins 62, 62 are provided for selective positioning within the holes 60, 60 to releasably secure each outrigger in a desired position of adjustment whereby the chocking surfaces are disposed in engagement or near engagement with the associated inner surfaces of laterally opposing tracks or wheels of a vehicle to be chocked. Thus, the chocking device 10a may be adjusted to prevent substantial lateral movement of the vehicle relative to the deck of an associated vehicle carrier.

I claim:

1. A chocking device for restraining a vehicle against lateral movement relative to a flatbed carrier having a horizontal vehicle supporting deck including an upwardly facing deck surface and having an opening therethrough, a pair of parallel support beams extending longitudinally of said carrier below and in supporting relation to the deck, the support beams being laterally spaced apart and defining opposing laterally inwardly facing abutments, said chocking device comprising a frame for positioning adjacent the deck surface to extend laterally of the deck and across the opening, chocking members supported at laterally opposite ends of said frame and defining laterally outwardly facing chocking surfaces for engaging the inner surfaces of a pair of laterally opposite wheels or tracks on a vehicle supported on the deck, and restraining means attached in fixed position to said frame and depending from said frame for extending through the opening and engaging the abutments to restrain said frame against lateral movement relative to the deck whereby said frame restrains the vehicle against lateral movement relative to the flatbed carrier.

2. The chocking device as set forth in claim 1 wherein said frame comprises a rigid frame formed by a plurality of individual structural members connected together in fixed relation to each other.

3. A chocking device as set forth in claim 2 wherein said chocking members comprise fixed opposite end portions of said frame.

4. A chocking device as set forth in claim 1 wherein said chocking members are adjustable relative to said frame to vary the lateral dimension of said chocking device.

5. A chocking device as set forth in claim 4 wherein said frame comprises a rigid frame formed by a plurality of structural members and said chocking members comprise outriggers supported on said frame.

6. A chocking device as set forth in claim 4 including means for securing said chocking members in selected positions of adjustment relative to said frame.

7. A chocking device as set forth in claim 6 wherein said securing means comprises latch pins engaged with said frame.

8. The combination comprising a vehicle carrier having a horizontal vehicle supporting deck including an upwardly facing deck surface, and a pair of parallel laterally spaced apart deck support members located below said deck and extending longitudinally of said carrier in supporting relation to said deck, said deck support members defining opposing laterally spaced apart and longitudinally extending abutments, said deck having an opening therethrough in vertical registry with at least a portion of the space between said abutments, and a vehicle chocking device including a choking frame resting on said deck adjacent said deck surface in laterally bridging relation to said opening and having means defining vertically disposed and longitudinally extending chocking surfaces at laterally opposite ends thereof for engaging laterally opposing inner surfaces of opposing supporting wheels or tracks on an associated vehicle supported on said deck, and restraining means mounted in fixed positions on said frame and extending through said opening for engaging said abutments to prevent lateral movement of said frame on and relative to said deck.

9. The combination as set forth in claim 8 wherein said restraining means comprises a pair of laterally spaced apart and longitudinally extending restraining members mounted in fixed position on the lower side of said frame and depending therefrom, said restraining members extending through said opening and defining laterally spaced apart and longitudinally extending bearing surfaces for engaging said abutments.

10. The combination as set forth in claim 9 wherein said chocking surface defining means are laterally adjustable relative to said frame and said device includes means for releasably retaining said chocking surface defining means in selected positions of adjustment relative to said frame.

11. The combination as set forth in claim 10 wherein said chocking surface defining means comprise outriggers slideably supported on said frame.

12. The combination as set forth in claim 10 including means for securing said outriggers in selected positons of adjustment relative to said frame.

13. The combination as set forth in claim 12 wherein said securing means comprises latch pins engaged with said outriggers and with said frame.

14. A vehicle chocking device for a flatbed carrier having a horizontal deck surface and means defining a pair of opposing parallel laterally inwardly facing abutments surfaces disposed in fixed position relative to the deck surface, said chocking device comprising a chocking member for positioning adjacent said deck surface and having laterally spaced apart and laterally outwardly facing chocking surfaces for engagement with opposing inner surfaces on the supporting wheels or tracks of an associated vehicle resting on said deck surface, and restraining means defining parallel laterally outwardly facing bearing surfaces for engaging said abutment surfaces to prevent lateral movement of said chocking device relative to said deck surface whereby said chocking device prevents lateral movement of said vehicle supporting wheels or tracks relative to said deck surface.

15. A chocking device as set forth in claim 14 wherein said chocking member comprises a generally rectangular frame formed from a plurality of connected structural members.

16. A portable chocking device for restraining a vehicle against lateral movement relative to a flatbed carrier having a horizontal vehicle supporting deck including an upwardly facing deck surface and longitudinally extending central opening through the deck, a pair of parallel support beams extending longitudinally of the carrier at laterally opposite sides of the opening below and in supporting relation to the deck, the beams defining opposing laterally inwardly facing abutment surfaces, said chocking device comprising a generally rectangular frame for resting on the surface of the deck in lateral bridging relation to the opening and including chocking members at laterally opposite ends thereof defining laterally outwardly facing chocking surfaces for engaging the inner surfaces of a pair of laterally opposite supporting wheels or tracks on a vehicle supported on the deck, and means for restraining said frame against lateral movement relative to the deck including a pair of laterally spaced apart and longitudinally extending restraining members attached in fixed position to said frame and projecting a fixed distance below said frame for extending through the opening and engaging the abutment surfaces below the deck whereby said frame restrains the vehicle against lateral movement relative to the flatbed carrier.

17. The combination comprising a vehicle carrier having a horizontal vehicle supporting deck, and a pair of parallel laterally spaced apart deck support members located below said deck and extending longitudinally of said carrier in supporting relation to said deck, said deck support members defining opposing laterally spaced apart and longitudinally extending laterally inwardly facing abutment surfaces, the deck having a laterally central opening therethrough, and a portable vehicle chocking device including a generally rectangular chocking frame resting on the upper surface of said deck in laterally bridging relation to said opening, means defining vertically disposed and longitudinally extending laterally outwardly facing chocking surfaces at laterally opposite ends of said chocking frame for engaging laterally opposing inner surfaces of opposite supporting wheels or tracks on an associated vehicle supported on said deck, and restraining means for cooperating with said deck support members to prevent lateral movement of said chocking frame on and relative to said deck and including a pair of laterally spaced apart and longitudinally extending restraining members mounted in fixed position on said chocking frame and depending from said chocking frame, said restraining members extending through said opening and having laterally outwardly facing bearing surfaces disposed at fixed positions below and relative to said chocking frame for engaging said abutment surfaces below said deck, said bearing surfaces being laterally spaced apart a distance substantially equal to the lateral distance between said abutments.

* * * * *